US00H002141H

(19) United States
(12) Statutory Invention Registration
Kevern et al.
(10) Reg. No.: US H2141 H
(43) Published: Jan. 3, 2006

(54) MULTIFIBER FERRULE

(75) Inventors: James D. Kevern, Wellsville, PA (US); Brian T. Patterson, Lewisberry, PA (US); Jeff Swartzbaugh, Dover, PA (US); Antonius Bernardus Gerardus Bolhaar, Wandenoyen (NL); Antonius Petrus Cornelius Maria Hultermans, Tilburg (NL); Martijn Scholten, Elst (NL)

(73) Assignee: Tyco Electronics Corporation, Middletown, PA (US)

(21) Appl. No.: 10/474,267

(22) PCT Filed: Apr. 8, 2002

(86) PCT No.: PCT/US02/10877

§ 371 (c)(1),
(2), (4) Date: Oct. 6, 2003

(87) PCT Pub. No.: WO02/082142

PCT Pub. Date: Oct. 17, 2002

(65) Prior Publication Data

US 2004/0120654 A1 Jun. 24, 2004

Related U.S. Application Data

(60) Provisional application No. 60/282,201, filed on Apr. 6, 2001.

(51) Int. Cl.
*G02B 6/36* (2006.01)

(52) U.S. Cl. ..... 385/55

(58) Field of Classification Search ..... 385/55, 385/56, 58–60, 70–72
See application file for complete search history.

(56) References Cited

U.S. PATENT DOCUMENTS 5,214,730 A * 5/1993 Nagasawa et al. ..... 385/59
6,416,236 B1 * 7/2002 Childers et al. ..... 385/84

* cited by examiner

*Primary Examiner*—Daniel Pihulic
(74) *Attorney, Agent, or Firm*—Synnestvedt & Lechner LLP

(57) ABSTRACT

A ferrule assembly comprising: (a) an array of optical fibers each having a mating end face; and (b) a ferrule with the fibers disposed therein, the ferrule having a front and rear orientation and a front surface, the front surface having at least a mating surface and a non-mating surface, the mating surface extending forward beyond the non-mating surface and presenting the mating end face of at least one of the fibers.

19 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

MULTIFIBER FERRULE

CROSS REFERENCE TO RELATED APPLICATIONS

This application to a U.S. national stage application based on International Application No. PCT/US02/10877, filed Apr. 8, 2002, which claims priority benefit under 35 U.S.C. § 119(e) to U.S. Provisional Application No. 60/282,201, filed Apr. 6, 2001, the disclosures of which are incorporated herein by reference.

FIELD OF INVENTION

The present invention relates generally to a ferrule and, more specifically, to a multifiber ferrule having an end-face geometry that facilitates improved physical contact.

BACKGROUND OF THE INVENTION

Optical fiber connectors are an essential part of substantially all optical fiber communication systems. For instance, such connectors are used to join segments of fiber into longer lengths, to connect fiber to active devices such as radiation sources, detectors and repeaters, and to connect fiber to passive devices such as switches and attenuators. The principal function of an optical fiber connector is to hold a fiber end such that the core of the fiber is axially aligned with the optical path of the component to which the connector is mating (e.g., another fiber, a waveguide, an optoelectric device). This way, all of the light from the fiber is optically coupled to the other component. It is well known that to effect optical coupling and minimize Fresnel loss, there must be sufficient "physical contact" between the optical path medium, which, in the case of optical connectors, is generally fiber.

Recently, to accommodate the ever-increasing number of fiber interconnections, MT ferrules have been introduced which accommodate an array of fibers. An example of a well-established MT connector is the Lightray MPX® optical interconnect system (Tyco Electronics Corportaion) which is cable of handling 24+ fibers. To accommodate all the fibers, the mating surface of an MT ferule tends to be larger than those used in single fiber ferrules. As used herein, the term "mating surface" refers to the portion of the ferrule that comes in contact with another optical component, such as another ferrule or waveguide, when the connector containing the ferrule is mated to the other optical component.

Although effective in handling a larger numer of fibers, MT ferrules have traditionally suffered from problems establishing good physical contact among all the fibers. The applicants have identified several causes for the difficulties in establishing physical contact with an MT ferrule, all of which involve the larger mating surface of the MT ferrule. One of the more significant difficulties arises with angular misalignment between the mating surface and the optical component to which the ferrule is intended to mate. Such angular misalignment will be more pronounced with a larger mating surface. More specifically, since angular misalignment between the mating surface and the optical component will cause the edge of the mating surface to contact the component first, a gap will result between the center of the mating surface and the component. Since the fiber ends are typically in the center of the mating surface, angular misalignment will necessarily separate the fibers' ends from the optical component and make physical contact more difficult.

Another reason why physical contact is more difficult in MT ferrules is the fact that a large mating surface is more difficult to deform to achieve physical contact. More specifically, making physical contact is often a function of deforming the ferrule such that the fiber end faces make physical contact. As a surface becomes larger, it becomes more difficult to deform. A greater surface area requires more force to maintain the same pressure. Often the required force is beyond the ability of the connector or interconnection system to deliver.

Yet another problem with establishing physical contact with a larger mating surface is the greater probability of encountering irregularities on the mating surface. The irregularities may be in the form of debris or surface anomalies. Such irregularities may prevent intimate contact with the other optical component and, thus, diminish the physical contact between the mating fiber ends.

Thus, there is a need to improve the physical contact made by a large number of fibers in a single ferrule. The present invention fulfills this need among others.

SUMMARY OF INVENTION

The present invention provides for an improved ferrule design which overcomes the aforementioned difficulties by reducing the area of the ferrule's mating surface while still accommodating a large number of fibers. More specifically, the ferrule of the present invention has a relatively small mating surface which projects out from the relatively large body of the ferrule. This way, the ferrule has the "bulk" to support a plurality of fibers, but its mating surface is focused to a relatively small area.

Since the mating surface is reduced to a small area, better physical contact can be achieved. Specifically, the reduced mating surface area tends to be more forgiving of angular misalignment. A smaller mating surface is also less likely to encounter irregularities which may impede physical contact. Finally, by reducing the mating surface, the force required to deform it is reduced as well.

Accordingly, one aspect of the present invention is a ferrule assembly having a mating surface of reduced area. In a preferred embodiment, the ferrule assembly comprises: (a) an array of optical fibers each having a mating end face; and (b) a ferrule with the fibers disposed therein, the ferrule having a front and rear orientation and a front surface, the front surface having a least a mating surface and a non-mating surface, the mating surface extending forward beyond the non-mating surface and presenting the mating end face of at least one of the fibers.

Another aspect of the present invention is an optical connector comprising the ferrule assembly described above. In a preferred embodiment, the optical connector comprises: (a) a housing; (b) a ferrule assembly in the housing, the ferrule assembly comprising: (i) an array of optical fibers each having a mating end face; and (ii) a ferrule with the fibers disposed therein, the ferrule having a front and rear orientation and a front surface, the front surface having at least a mating surface and a non-mating surface, the mating surface extending forward beyond the non-mating surface and presenting the mating end face of at least one of the fibers.

Still, another aspect of the present invention is a method for manufacturing the ferrule assembly. In a preferred embodiment, the method comprises the steps of: (a) providing a ferrule comprising a body having a front and rear orientation and a front surface and openings for holding the array of fibers and presenting the ends of the fibers for mating; (b) forming a mating surface and a non-mating surface on the front surface, the mating surface extending forward beyond the non-mating surface and presenting the mating end face of at least one of the fibers.

DETAILED DESCRIPTION OF PREFERRED EMBODIMENT

Figure 1:
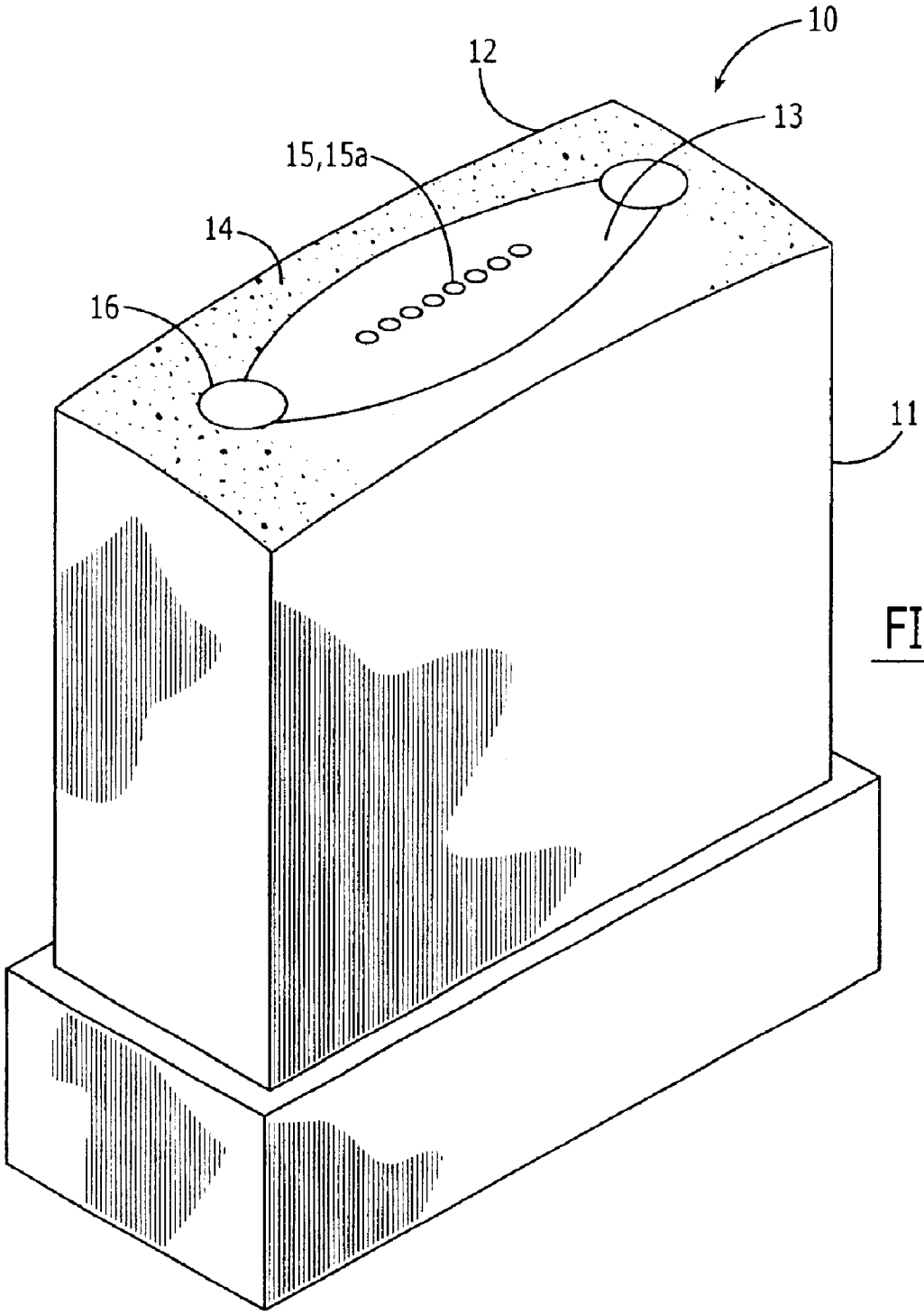
FIG. 1 shows a preferred embodiment the ferrule of the present invention.

Referring to FIG. 1, a preferred embodiment of the ferrule assembly 10 of the present invention is shown. The ferrule assembly 10 comprises an array of optical fibers 15 disposed in a ferrule 11 such that the mating end 15*a* of each fiber is presented for mating with another connector or optical interface. The ferrule has a front and rear orientation and a front surface 12. As used herein, the term "front surface" refers to the surface of the forward facing side(s) of the ferrule. It should be understood that a front surface may correspond to one or more distinct surfaces which may or may not be contiguous. The front surface 12 comprises a mating surface 13 and a non-mating surface 14. The mating surface 13 extends forward beyond the non-mating surface 14 and presents the mating end faces of at least one of the fibers 15.

An important feature of the present invention is that the mating surface is just a fraction of the front surface. In a preferred embodiment, the area of the mating surface compared to the area of the front surface 12 is no greater than about 50%, more preferably, no greater than about 30%, and, even more preferably, no greater than about 20%. For example, in a highly preferred embodiment, in a ferrule having a front surface of about 15 $mm^2$, the mating surface is less than 3 $mm^2$, and, in a ferrule having a front surface of about 11 $mm^2$, the mating surface is less than 2 $mm^2$.

Figure 3:
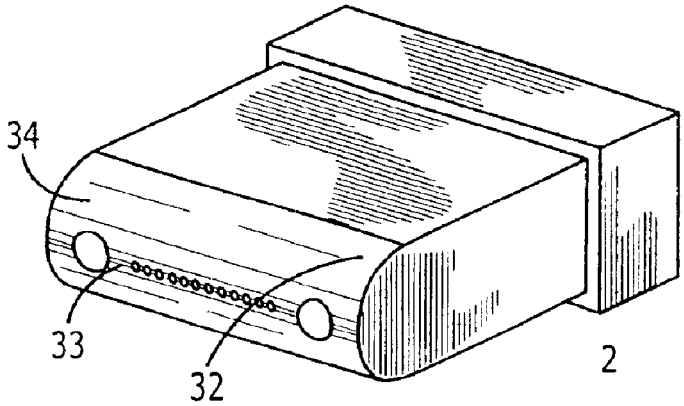

In the embodiment of FIG. 1, the mating surface 13 is substantially planar, although the present invention is not restricted to this configuration. For example, with reference to FIG. 3, the front surface 32 may be curved in which case the mating surface 33 is the apex of the curve and the non-mating surface 34 would be the remaining area of the curved surface.

Figure 2:
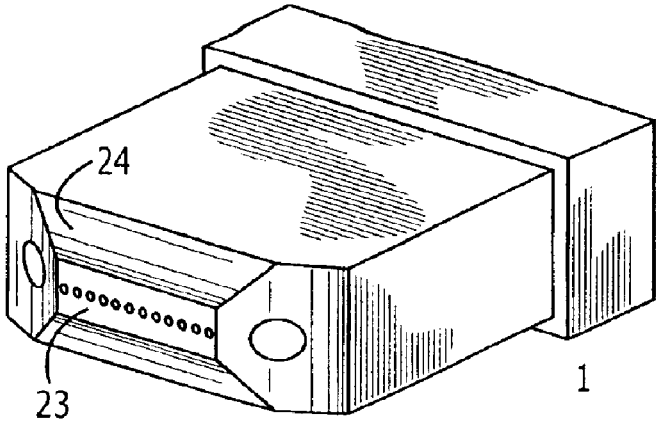
FIGS. 2–8 show alternative preferred embodiments of the ferrule of the present invention.
Figure 5:
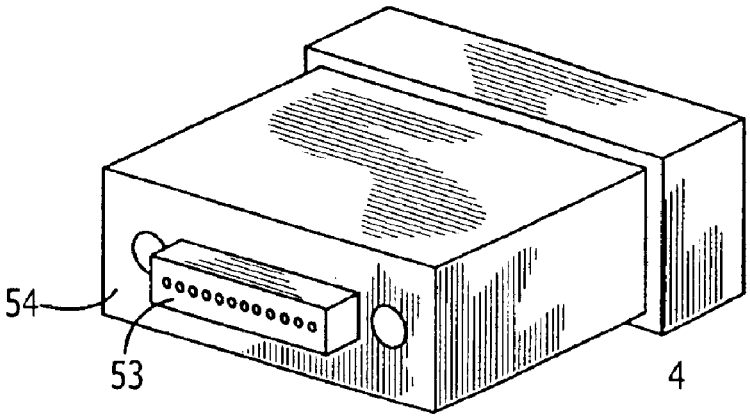
Figure 6:
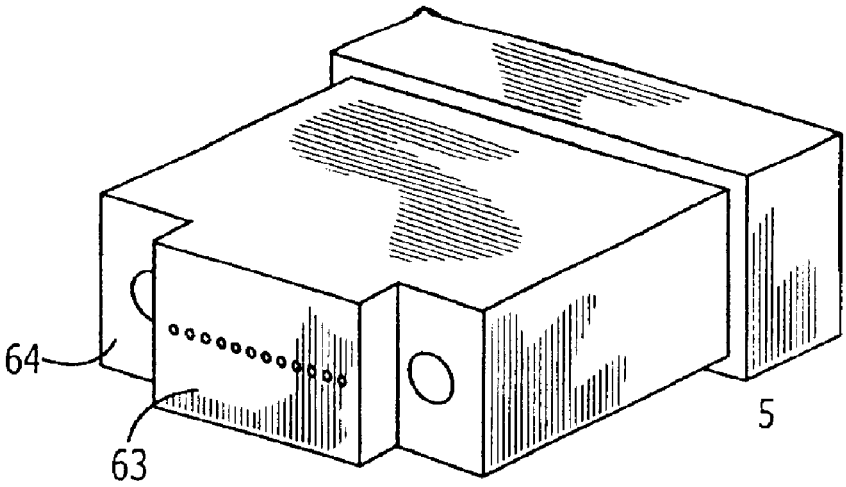

In the embodiment of FIG. 1, the mating surface 13 is planar (as mentioned above) while the non-mating surface 13 is curved. The present invention, however, is not limited to a ferrule configuration in which the non-mating surface is curved. For example, with reference to FIG. 2, the non-mating surface 24 comprises planar facets beveled with respect to the mating surface 23. Additionaly, with respect to FIGS. 5 and 6, both the mating surfaces 53, 63 and the non-mating surfaces 54, 64 are planar. In such a case, the mating and non-mating planar surfaces may be on parallel planes.

In the embodiment of FIG. 1, the perimeter of the mating surface 13 is surrounded by the non-mating surface 14. The invention, however, is not limited to such a configuration and it is within the scope of the present invention that just a portion of the perimeter of the mating surface is adjacent to the non-mating surface. For example, referring to FIG. 6, the mating surface 63 is substantially rectilinear and non-mating surface 64 is adjacent to just two sides of the mating surface 63.

Figure 8:
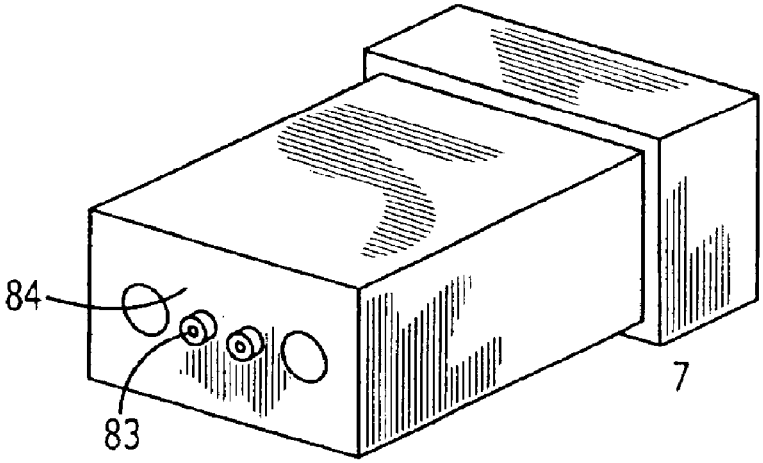

In the embodiment of FIG. 1, the ends of all the fibers 15 are presented in a single mating surface 13. The present invention, however, is not limited to such an embodiment. For example, with respect to FIG. 8, the front surface 12 may comprise a plurality of mating surfaces 83 each presenting one or more fiber ends for optical coupling. In the embodiment of FIG. 8, two mating surfaces 83 are shown extending past a non-mating surface 84. Each mating surface 83 comprises a single fiber.

The ferrule shown in FIG. 1 is a MT-type ferrule which is well known in the art. One characteristic of an MT type ferrule is an alignment pin hole 16 which are adapted to receive alignment pins (not shown). Although an MT type ferrule is particularly well suited for a configuration of the present invention, the present invention is by no means limited to the MT type ferrule and may be practiced with any ferrule design in which physical contact between the fiber ends is required.

Figure 4:
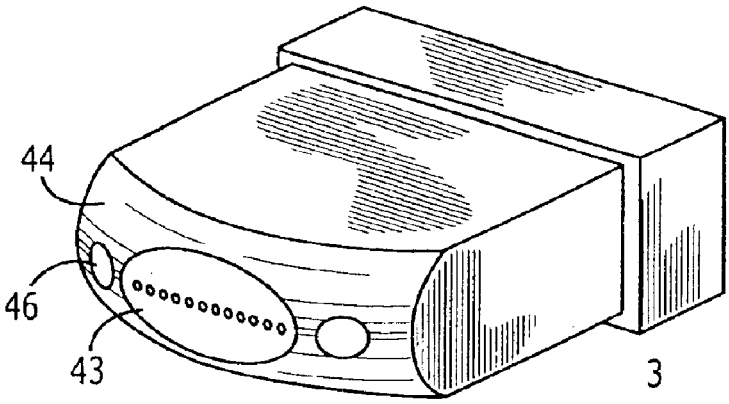

Upon close inspection of the mating surface 13 of FIG. 1, it becomes clear that the alignment pin holes 16 are contiguous to the mating surface 13. It may be preferable however to have the pin alignment hole 16 isolated from the mating surface 13 and thus situated within the non-mating surface 14. More specifically, applicants have observed that debris often collects around the alignment pin holes 16, presumably due to the wiping action that the perimeter of such holes has as the pins are inserted therein. If the mating surface 13 is immediately adjacent to such alignment holes 16, it is likely to gather debris which would interfere with its mating to an optical component and, thus, diminish the effectiveness of the physical contact between the fiber ends. Therefore, it may be preferable to isolate the alignment pin hole 16 from the mating surface 13 as shown in FIG. 4. As shown alignment pin holes 46 are within the non-mating surface 44. Thereby, any debris gathering around alignment pin hole 46 is less likely to impede the ability of the mating surface 43 to make intimate contact with a mating component and thus achieve physical contact between the fiber ends and the optical path of the mating component.

Figure 7:
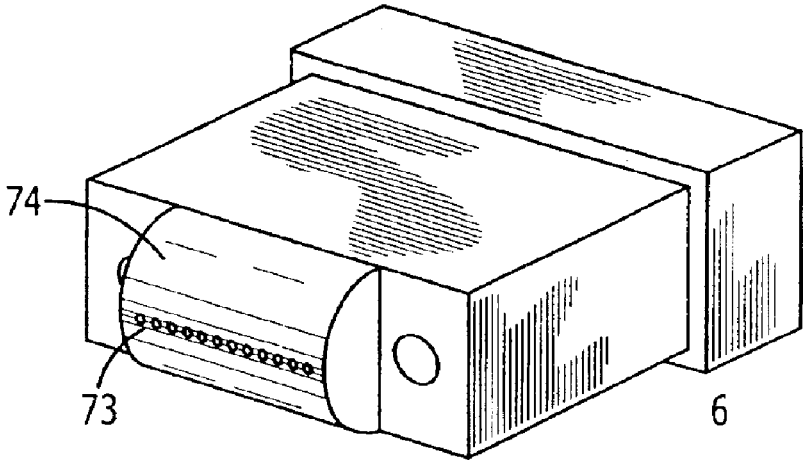

Likewise, with respect to FIG. 7, the non-mating surface 74 around the alignment pin holes accomodates any debris which may form around the alignment holes to prevent the debris from fouling the mating surface 73.

In general, a ferrule assembly having a planar mating surface 13 and a curved non-mating surface 14 is preferred from a manufacturing stand point since such a configuration can be achieved using existing apparatus and known techniques. More specifically, the curved non-mating surface 14 can be effected by exploiting known polishing techniques in which a ferrule assembly is polished on a compliant polishing wheel which deforms as the ferrule assembly is impressed upon it. A typical compliant polishing wheel may comprise, for example, a rubber plate or a glass plate with a rubber bottom. As the ferrule is impressed upon the compliant polishing wheel, the wheel deforms thereby resulting in a greater force being applied to the perimeter of the front surface 12 than to the center of the surface. This naturally results in the perimeter of the surface wearing away more rapidly than the center. This eventually results in a eventually results in a domed or curved end face 12 in which the apex of the curve corresponds to the center of the front end wherein the fiber ends 15*a* are typically located.

At this point, a non-compliant polishing wheel may be used to flatten the apex to create the mating surface 13. Specifically, a non-compliant polishing wheel initially contacts just the apex region of the ferrule front end. Since the wheel is not compliant, it will tend to polish a planar mating surface at the apex of the dome. A non-compliant polishing wheel may comprise, for example, a glass plate with no rubber or compliant element.

What is claimed is:

1. A ferrule assembly comprising:

an array of optical fibers each having a mating end face; and a ferrule with said fibers disposed therein, said ferrule having a front and rear orientation and a front surface, said front surface having at least a mating surface and a non-mating surface, said mating surface extending forward beyound said non-mating surface and presenting the mating end face of at least one of said fibers.

2. The ferrule assembly of claim 1, wherein the area of said mating surface is no greater than about 50% of the area of said front surface.

3. The ferrule assembly of claim 2, wherein the area of said mating surface is no greater than about 30% of the area of said front surface.

4. The ferrule assembly of claim 3, wherein the area of said mating surface is no greater than about 20% of the area of said front surface.

5. The ferrule assembly of claim 1, wherein said mating surface is planar.

6. The ferrule assembly of claim 1, wherein said front surface is curved and said mating surface is at the apex of the curve.

7. The ferrule assembly of claim 1, wherein said mating surface is planar and said non-mating surface is curved.

8. The ferrule assembly of claim 1, wherein said mating surface is planar and said non-mating surface is planar.

9. The ferrule assembly of claim 8, wherein said mating surface and said non-mating surface are on parallel planes.

10. The ferrule assembly of claim 1, wherein the perimeter of said mating surface is surrounded by said non-mating surface.

11. The ferrule assembly of claim 1, wherein said mating surface presents the ends of all of said fibers.

12. The ferrule assembly of claim 1, wherein said front surface comprises two or more mating surfaces.

13. The ferrule assembly of claim 12, wherein each mating surface comprises a single fiber.

14. An optical connector comprising:

a housing;

a ferrule assembly in said housing, said ferrule assembly comprising:

an array of optical fibers each having a mating end face; and a ferrule with said fibers disposed therein, said ferrule having a front and rear orientation and a front surface, said front surface having at least a mating surface and a non-mating surface, said mating surface extending forward beyond said non-mating surface and presenting the mating end face of at least one of said fibers.

15. A method of manufacturing a ferrule assembly comprises the steps of:

providing a ferrule comprising a body having a front and rear orientation and a front surface and openings for holding said array of fibers and presenting the ends of said fibers for mating;

forming a mating surface and a non-mating surface on said front surface, said mating surface extending forward beyond said non-mating surface and presenting the mating end face of at least one of said fibers.

16. The method of claim 15, further comprising:

fixing optical fibers in said openings prior to forming said mating surface.

17. The method of claim 16, wherein forming said mating and non-mating surfaces comprises at least the steps of polishing said ferrule to form a curved front surface;

polishing said curved front surface to form said mating surface.

18. The method of claim 17, wherein forming said curved front surface is performed using a compliant polishing wheel.

19. The method of claim 18, wherein forming said mating surface is performed using a substantially non-compliant polishing wheel.

* * * * *